United States Patent [19]

Haslinger et al.

[11] Patent Number: 4,975,241
[45] Date of Patent: Dec. 4, 1990

[54] WEAR-REDUCTION-SLEEVE FOR THIMBLES

[75] Inventors: Karl H. Haslinger, Bloomfield; Douglas S. Porter; Michael L. Martin, both of Simsbury; Woodruff H. Higgins, Windsor, all of Conn.

[73] Assignee: Combustion Engineering, Inc., Windsor, Conn.

[21] Appl. No.: 226,109

[22] Filed: Jul. 29, 1988

[51] Int. Cl.⁵ .............................................. G21C 17/00
[52] U.S. Cl. .................................... 376/352; 376/254; 376/292
[58] Field of Search ............... 376/254, 292, 245, 352, 376/463, 365

[56] References Cited

U.S. PATENT DOCUMENTS

| 4,716,004 | 12/1987 | Merkovsky et al. | 376/245 |
| 4,717,529 | 1/1988 | Merkovsky et al. | 376/245 |
| 4,751,039 | 6/1988 | Delevallee et al. | 376/254 |
| 4,778,647 | 10/1988 | Gasparro | 376/245 |
| 4,822,558 | 4/1989 | Merkovsky et al. | 376/245 |

OTHER PUBLICATIONS

"Flow Induced Vibrations", Bowness-on-Windermere, England, May 1987, Gorman et al.

Primary Examiner—Daniel D. Wasil
Attorney, Agent, or Firm—John H. Mulholland

[57] ABSTRACT

A wear-reduction-sleeve for in-core-instrumentation thimbles of a pressurized water nuclear reactor having bottom mounted instrumentation to curtail flow induced excitation and increase support contact area in the region of thimble length which extends through and defines an annulus with the core support plate and extends upwardly to and through the fuel assembly flow distribution plates. The wear-reduction-sleeve includes a hollow shank portion which gives a low wear coefficient when in contact with the chrome-plated thimble and is inserted into the annulus and below where it is radially expanded and secured to a thimble guide tube. An upper portion of the wear-reduction-sleeve between the core support plate and flow distribution plate has a flow collection chamber and radial flow exit slots which divert thimble flow substantially away from the hole in the fuel assembly flow distribution plate through which the thimble extends.

6 Claims, 2 Drawing Sheets

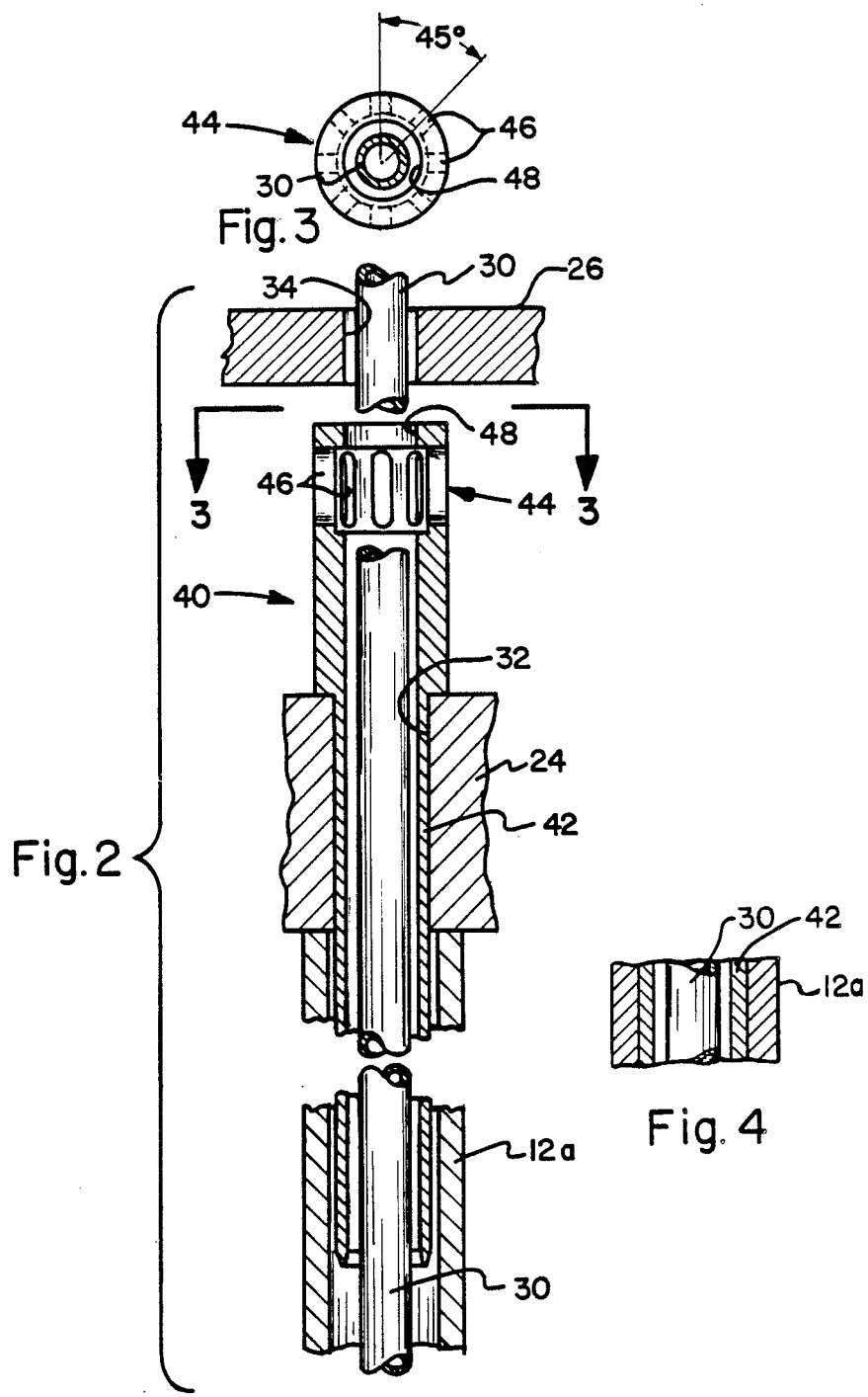

WEAR-REDUCTION-SLEEVE FOR THIMBLES

BACKGROUND OF THE INVENTION

In-core-instrumentation (ICI) thimbles in several pressurized water reactor (PWR) systems have experienced excessive wear due to flow induced vibrations. This situation has led to the early and costly replacement of ICI thimbles at various plants. In a typical arrangement of a PWR with bottom mounted ICIs, the thimbles are inserted from a seal table through guide tubes and through vessel penetrations into the reactor. From there they are guided, by instrument thimble guide tubes, through the lower support structure and further on through a centrally located tube of certain fuel assemblies to the desired location and elevation within the fuel core. These ICI thimbles provide the guide path for insertion of moveable nuclear flux detectors used for reactor operation. The lower regions of fuel assemblies include very narrow annuli within the fuel assembly flow distribution plate (FDP), nozzle block or lower end fitting, where the majority of ICI thimble wear has been observed.

Several researchers have investigated the flow induced vibration aspects in this region. Gorman et al, in a paper presented in May of 1987 at the Flow-Induced Vibration Conference, BHRA, Bowness-on-Windermere, England, have attributed, for a certain geometry, the predominant flow dependent forcing mechanism to that of axial exit divergence flow from the thimble guide tube. The driving force for this flow stream is the pressure drop that exists during normal operation between the bottom of the ICI thimble guide tube (in the lower reactor vessel head region) and the top of the thimble guide tube (at the core support plate).

The invention is for use to limit wear of ICI thimble guide tubes thus extending their useful life, and is in the form of a special flow induced vibration reduction/wear-reduction-sleeve.

DESCRIPTION OF THE RELATED ART

Attempts at solving the problem of ICI thimble wear due to a significant portion of the thimbles being exposed to turbulence in the region between the upper surface of the core support plate and the lower surface of the fuel assembly flow distribution plate, can be found discussed in U.S. Pat. No. 4,716,004. In that patent, the idea of fully shielding the thimble in this region by means of solid guides is discussed and disparaged because of manufacturing tolerance problems.

The present invention has been developed by extensive experimental investigation of the vibration response of a flexible tube due to simulated reactor core, cross and annular exit flows. The inventors' investigation involved construction of an instrumented flow visualization model which was used to investigate the vibrational behavior of ICI thimbles in the original plant configuration as well as for several wear-reduction-sleeve designs. The following conclusions, among others, were drawn:

1. The predominant mechanism of vibration in the original plant configuration was that of the normal reactor coolant core flow, exciting the exposed portion of the ICI thimbles.
2. For cross-flow and thimble flow rates that were well above those considered to be representative of the plant conditions, excitation intensity was much less than for normal core flow.
3. Installation of a straight sleeve design significantly protects the ICI thimble from the critical core flow streams. However, for a given pressure drop across the guide tube, a marginal situation (to protect against instability) was determined for a guide tube pressure drop of 6 psid that was used as the design criterion.
4. Incorporation of the circumferential, internal collection pocket and eight radial exit slots of the wear-reduction-sleeve of the invention considerably reduced the susceptibility to thimble flow excitation.
5. Installation of the wear-reduction-sleeve of the invention with its radial exit slots (considering larger wear surfaces, and protection against cross-flow excitation, and resulting reduction in the amount of wear contact time and contact forces) is expected to increase the wear life of the ICI thimbles by at least a factor of ten.
6. ICI thimble excitation from core, cross and thimble flow streams are highly dependent upon the geometry of the "through the reactor" flow passages.

SUMMARY OF THE INVENTION

The wear-reduction-sleeve of the invention is for use on in-core-instrumentation thimbles of pressurized water nuclear reactors to curtail flow induced excitation and increase support contact surface area in a region of thimble length which extends through a core support plate and upwardly to and through a fuel assembly flow distribution plate spaced from and above the core support plate.

The wear-reduction-sleeve fills and extends below an annulus defined by the core support plate and the thimble passing through it such that increased support contact area and reduced wear is provided. The thimble is chrome-plated in this contact area to further limit wear. The lower end of the sleeve is radially expanded to secure it to a thimble guide tube below the core support plate.

Included in the wear-reduction-sleeve, between the core support plate and the flow distribution plate, is an enlarged circumferential portion which defines an internal thimble flow collection pocket with a plurality of radial flow exit slots. The circumferential portion diverts the major portion of thimble flow radially and substantially away from the fuel assembly flow distribution plate area through which the thimble extends. Tests show that flow induced excitation and resulting wear may be substantially reduced in this manner.

BRIEF DESCRIPTION OF THE DRAWINGS

FIG. 2 is a schematic cross-sectional elevational view of the novel wear-sleeve of the invention in place in a reactor of the type illustrated in FIG. 1;

FIG. 3 is a cross-section taken along the line 3—3 of FIG. 2;

FIG. 4 illustrates in cross-section a fragmentation portion of lower cylindrical portion of the wear reduction sleeve which surrounds the thimble, substantially fills the annulus and is secured by being locally expanded radially outwards against the wall of the thimble guide tube. It may be located anywhere along the lower cylindrical portion within the thimble guide tube, for instance, in the portion broken away in FIG. 2.

DESCRIPTION OF THE PREFERRED EMBODIMENT

Figure 1:
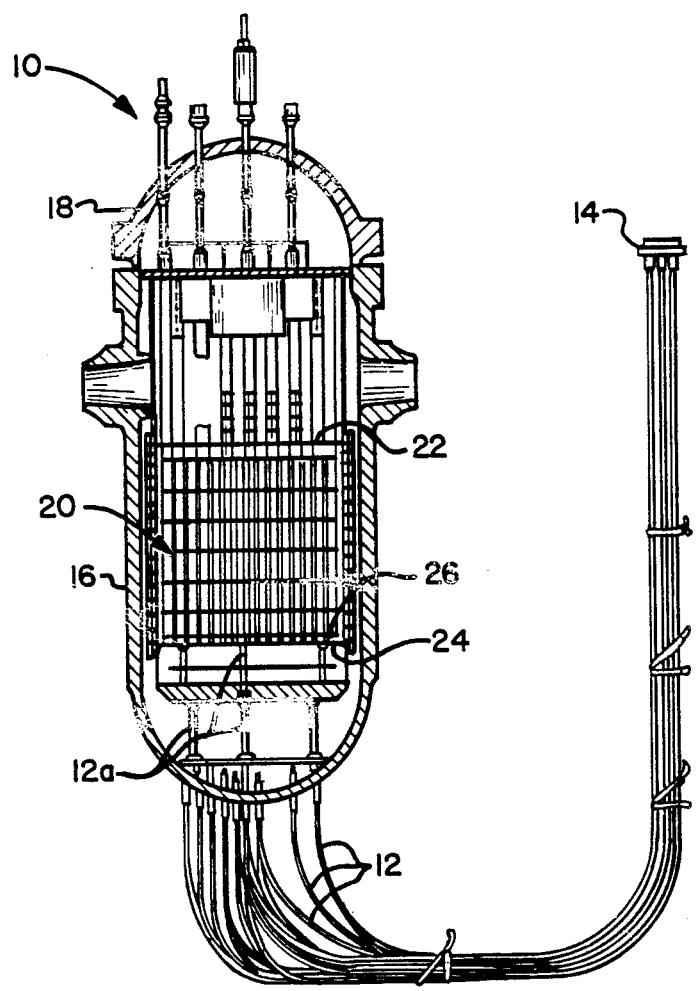
FIG. 1 is a schematic elevational view of a pressurized water nuclear reactor of the type which has in-core-instrumentation thimbles and thimble guide tubes and which can be improved by use of the novel wear-sleeve of the invention.

The numeral 10 generally designates a pressurized water nuclear reactor having bottom mounted in-core-instrumentation guide tubes 12 connected to a seal table 14 in a manner well known in the art.

The reactor 10 includes a vessel 16 and vessel head 18 and a core 20 made up of a plurality of fuel assemblies. The core 20 has an upper core plate 22 above it and a lower core plate 24 below it. The fuel assemblies of core 20 each have a flow distribution plate 26 spaced from and located above the lower core plate 24. A plurality of instrument thimble guide tubes 12a are shown within the reactor vessel schematically. These thimble guide tubes 12a guide the in-core-instrumentation thimble tubes or thimbles 30 up through the bottom of vessel 16, the openings 32 in core support plate 24 and openings 34 in the fuel assembly flow distribution plate 26. These thimbles 30 provide the guide path for the insertion of moveable nuclear flux detectors (not shown) used for reactor operations. Other reactor structure of FIG. 1 is not pertinent to the invention description.

Without the wear-reduction-sleeve, the majority of the in-core-instrumentation thimble wear in reactor 10 will occur in the very narrow annulus between opening 34 and thimble 30, thus limiting the area of contact in the case of lateral movement. Installation of the wear-reduction-sleeve not only increases the contact area but also shields the otherwise exposed thimble tube from normal reactor flow excitation, thus eliminating the major source of thimble tube excitation. The excitation forces that would be produced by the thimble flow stream are curtailed by redirecting the thimble flow radially outwards, thus avoiding excessive divergence flow excitation levels.

The reduction of flow induced vibration and thus, the extended life, is due to a wear-reduction-sleeve which is generally designated by the numeral 40.

The wear-reduction-sleeve 40 provides lower wear coefficients, larger wear surfaces, and reduced excitation forces in a particular region of length of thimble 30. The region of length of thimble 30 extends through and defines an open annulus with the wall of opening 32 of core support plate 24 and extends upwardly to and through opening 34 in the illustrated area of the fuel assembly flow distribution plate 26 spaced from the core support plate 24 above said annulus. There are a plurality of wear-reduction-sleeves 40 for each fuel assembly of core 20.

The wear-reduction-sleeve 40 includes a lower cylindrical portion 42 of its region of length which extends downwardly through opening 32 of core support plate 24 and into the thimble guide tube 12a. The portion 42 is chrome-plated and provides thimble wear reduction by means of an increased support contact surface area, lower wear coefficients and reduction in thimble flow rates. The portion 42 surrounds the thimble 30, substantially fills the annulus and is secured by being locally expanded radially outwards against the wall of thimble guide tube 12a.

A means for collecting the major portion of thimble flow and diverting it radially and substantially away from the lower surface of fuel assembly distribution plate 26 in approximately the area illustrated schematically in FIG. 2 and through which, by means of opening 34, the thimble 30 extends, is generally designated by the numeral 44.

The means 44 is a radially enlarged circumferential portion which defines an internal thimble flow collection pocket with a plurality of radial flow exit slots 46. An end opening 48 substantially surrounds thimble 30 in close proximity thereto such that the major portion of thimble flow is diverted radially between core support plate 24 and the flow distribution plate 26 in a direction substantially away from the fuel assembly flow distribution plate 26's area and opening 34 through which the thimble 30 extends.

In this manner, the wear-reduction-sleeve 40 portion 42 increases support contact surface area and reduces thimble flow and portion 44 curtails flow induced excitation. The useful life of the thimbles is, accordingly, increased.

What is claimed is:

1. In a nuclear reactor having a core support plate with an annulus therein, a fuel assembly distribution-plate with an opening therein and spaced from the core support plate, an in-core-instrumentation thimble, a thimble guide tube, and a wear-reduction-sleeve for said in-core-instrumentation thimble to curtail flow induced excitation in a region of thimble length which extends through said annulus and upwardly to and through said opening,
    said wear-reduction-sleeve including in combination:
    means for surrounding said thimble in the portion of its region of length in said annulus and substantially filling said annulus to increase support contact surface area; and
    means for collecting a major portion of thimble flow and diverting it radially away from said wear-reduction-sleeve and said opening.

2. The wear-reduction-sleeve of claim 1 in which the means for surrounding the thimble and substantially filling said annulus is chrome-plated and in contact with a thimble surface to provide thimble wear reduction.

3. The wear-reduction-sleeve of claim 1 in which the means for surrounding the thimble and substantially filling said annulus is extended below said core support plate and into said thimble guide tube.

4. The wear-reduction-sleeve of claim 3 in which the means for surrounding the thimble and substantially filling said annulus is locally expanded radially outwards against said thimble guide tube.

5. The wear-reduction-sleeve of claim 1 in which the means for collecting and diverting said major portion of thimble flow is located between said core support plate and said flow distribution plate and includes a radially enlarged circumferential portion which defines an internal thimble flow collection pocket with a plurality of radial flow exit slots.

6. The wear-reduction-sleeve of claim 5 in which said radially enlarged circumferential portion defines a surface for engagement with said core support plate.

* * * * *